(12) United States Patent
Shedden et al.

(10) Patent No.: US 12,284,291 B2
(45) Date of Patent: Apr. 22, 2025

(54) APPARATUS AND METHOD FOR VERIFYING ELECTRONIC RECORDS

(71) Applicant: SITA Information Networking Computing UK Limited, Middlesex (GB)

(72) Inventors: Rowan Shedden, Sydney (AU); Adrien Sanglier, Monteral (CA); Barry John McLaughlin, Letterkenny (IE)

(73) Assignee: SITA Information Networking Computing UK Limited (GB)

( * ) Notice: Subject to any disclaimer, the term of this patent is extended or adjusted under 35 U.S.C. 154(b) by 195 days.

(21) Appl. No.: 18/299,451

(22) Filed: Apr. 12, 2023

(65) Prior Publication Data

US 2023/0254158 A1 Aug. 10, 2023

Related U.S. Application Data

(63) Continuation of application No. PCT/EP2021/078659, filed on Oct. 15, 2021.

(30) Foreign Application Priority Data

Oct. 22, 2020 (GB) ..................................... 2016803

(51) Int. Cl.
H04L 9/32 (2006.01)
(52) U.S. Cl.
CPC .......... *H04L 9/3247* (2013.01); *H04L 9/3218* (2013.01)
(58) Field of Classification Search
CPC ............................ H04L 9/3247; H04L 9/3218
See application file for complete search history.

(56) References Cited

U.S. PATENT DOCUMENTS

| 2018/0183586 A1* | 6/2018 | Bhargav-Spantzel ....................... G06F 21/32 |
| 2019/0289017 A1* | 9/2019 | Agarwal ............... H04L 9/0643 |
| 2020/0051074 A1* | 2/2020 | Suh ........................ G06Q 20/36 |

FOREIGN PATENT DOCUMENTS

| EP | 3319006 A1 | 5/2018 |
| EP | 3324573 A1 | 5/2018 |

OTHER PUBLICATIONS

International Search Report and Written Opinion issued in International Application No. PCT/EP2021/078659, mailed Jan. 14, 2022.
(Continued)

*Primary Examiner* — Mohamed A. Wasel
(74) *Attorney, Agent, or Firm* — Morris, Manning & Martin, LLP; Daniel E. Sineway, Esq.; Adam J. Thompson, Esq.

(57) ABSTRACT

An apparatus is provided for verifying a plurality of cryptographically signed user electronic records using a corresponding cryptographic proof. Cryptographic keys for verifying the plurality of user electronic records, and corresponding user electronic record schemas are cached in a local data store. The apparatus obtains up-to-date copies of the cryptographic keys and schemas for caching from a remote data store when the remote data store is accessible by the apparatus over the internet. Upon receipt of the data from the user device, when the remote data store is not accessible, the apparatus is configured to identify the cached cryptographic key and schema corresponding to the received cryptographically signed electronic record and cryptographic proof; and determine a verification result for the cryptographically signed electronic record based on the cryptographic proof and the identified cached cryptographic key and schema. An indication of the verification result is then output from the apparatus.

19 Claims, 3 Drawing Sheets

(56) References Cited

OTHER PUBLICATIONS

Daniel Slamanig et al, "Disclosing verifiable partial information of signed CDA documents using generalized redactable signatures", E-Health Networking, Applications and Services, 2009. Healthcom 2009. 11th International Conference on, IEEE, Piscataway, NJ, USA, Dec. 16, 2009, pp. 146-152, XP031623854.

Iain Barclay et al, "Certifying Provenance of Scientific Datasets with Self-sovereign Identity and Verifiable Credentials", arxiv. org, Cornell University Library, 201 Olin Library Cornell University Ithaca, NY 14853, Apr. 6, 2020, XP081638158.

Combined Search and Examination Report issued in Application No. GB2016803.5, dated Jul. 7, 2021.

* cited by examiner

APPARATUS AND METHOD FOR VERIFYING ELECTRONIC RECORDS

CROSS REFERENCE TO RELATED APPLICATIONS

This application is a continuation of International Patent App. No. PCT/EP2021/078659, filed Oct. 15, 2021, and entitled "AN APPARATUS AND METHOD FOR VERIFYING ELECTRONIC RECORDS," which claims the benefit of and priority to Great Britain Application No. 2016803.5, filed Oct. 22, 2020, and entitled "AN APPARATUS AND METHOD FOR VERIFYING ELECTRONIC RECORDS," each of which are incorporated by reference in their entirety herein.

FIELD OF THE INVENTION

This application relates to an apparatus for verifying record documents associated with a user, in particular an apparatus for verifying cryptographically signed electronic records that is able to operate in an offline environment, e.g. where there is no access to an internet connection.

BACKGROUND OF THE INVENTION

Record documents may include licences or certificates, and corresponding logs, such as pilot licences, boatmasters' licence, driving licences and the like, or record documents identifying or authorising individuals and/or their skills or competencies. For example, the record document may identify an engineer certified to carry out maintenance and repairs to particular systems, or it may identify an individual's access levels to restricted areas.

These licences, logs, and other record documents are traditionally issued in a printed paper or plastic form for manual visual verification by an inspector as required. However, it can be difficult for third parties to reliably authenticate these record documents, particularly where record documents having different formats/characteristics may be issued by respective national authorities. This means that an individual attempting to authenticate the record document may not be as familiar with these characteristics and the official format of the record document, and so they may not be able to reliably identify record documents that have been falsified in a sophisticated manner. Furthermore, these paper or plastic documents may become out of date, for example if a licence endorsement or log update occurs between issuance of the plastic or paper documents and their standard expiry term.

As such, there is a desire to transition such record documents to electronic versions that can be maintained up to date and stored or transferred electronically for ease of access and reliable authentication; however, it can be seen that the storage of record documents in electronic form actually opens up new possibilities for malicious actors to tamper with existing electronic records, or to create new falsified electronic records. Furthermore, if the inspector relies upon obtaining an electronic record document from the issuing authority at the time of inspection then the verification would not be able to proceed in an offline environment where the record bearer and the inspector do not have access to the internet.

Therefore, we have appreciated that it would be desirable to provide a method and system for handling electronic record documents that can be reliably verified while maintaining high levels of privacy for the individual associated with the electronic record document, and that can also be performed in an offline environment.

SUMMARY OF THE INVENTION

The invention is defined in the independent claims to which reference should now be directed. Advantageous features are set out in the dependent claims.

In a first aspect, the invention relates to an apparatus for verifying a plurality of user electronic records, wherein each user electronic record is a cryptographically signed electronic record. The apparatus comprises a first communication module configured to receive a data transmission from a user device, the data transmission comprising a cryptographically signed electronic record for verification and a corresponding cryptographic proof and a local data store configured to cache at least one cryptographic key, for verifying the plurality of user electronic records, and at least one schema indicating the semantics of one or more electronic record data structures corresponding to the plurality of user electronic records. The apparatus further comprises a second communication module configured to communicate with a remote data store over the internet and a processor. In a first mode, the processor is configured to poll the remote data store, via the second communication module, to obtain up-to-date copies of the at least one cryptographic key and the at least one schema and to cache these in the local data store. In a second mode, the processor is configured to, upon receipt of the data transmission from the user device, identify the cached cryptographic key and schema corresponding to the received cryptographically signed electronic record and cryptographic proof. The processor then determines a verification result for the cryptographically signed electronic record based on the cryptographic proof and the identified cached cryptographic key and schema. An output is further configured to provide an indication of the verification result from the apparatus. The first mode corresponds to the remote data store being accessible by the apparatus, via the second communication module, and the second mode corresponds to the remote data store not being accessible by the apparatus.

Advantageously, the apparatus enables the authenticity of an electronic record stored on a user device to be independently inspected and reliably verified in an offline environment whilst maintaining a high level of privacy control for the subject of the electronic records. This is particularly valuable for inspectors working on remote outstations or areas where network connectivity is limited and may not be available at the time of inspection of the user electronic record.

Optionally, determining a verification result for the cryptographically signed electronic record comprises operating on the cryptographic proof with the identified cached cryptographic key. This advantageously provides a simple and robust way to verify the electronic record being inspected.

Optionally, the first communication module is configured to receive the data transmission from the user device over one of a visually encoded, audio encoded, or radio frequency encoded communication channel. In a particular embodiment, the first communication module comprises an imaging device configured to read the visually encoded data transmission. This advantageously provides a direct communication path without requiring any functionality other than a camera and a display, which would typically be present in even basic mobile devices.

Optionally, the remote data store is a blockchain; this provides a single version of truth regarding the required key cryptography that can be shared between many different parties in a simple and cost effective manner. Optionally, the signing of the cryptographically signed electronic record may be by a digital signature, or by a cryptographic hash, or by a zero-knowledge proof.

Optionally, the output may comprise a display, and the output may be configured to provide the indication of the verification result as a visual indication output to the display. This advantageously provides a quick and effective way for the inspector to review the result of the verification.

Optionally, the cached at least one cryptographic key may be associated with an expiry time and the processor may be further configured to determine whether the expiry time has elapsed. The output may then be configured to provide an indication that the verification is out of date if the expiry time is determined by the processor to have elapsed. This advantageously supports improved cryptographic key management and revocation.

Optionally, the user electronic record is an electronic pilot licence, and the user device is a pilot device.

Optionally, the apparatus communicating with the user device may be considered to form a system where and the user device may further comprise a user electronic record store configured to store the cryptographically signed electronic record and the corresponding cryptographic proof. A user device communication module may also be provided and configured to, in response to a user input, send the data transmission from the user device to the apparatus, wherein the data transmission comprises the cryptographically signed electronic record and the corresponding cryptographic proof.

In a second aspect of the present invention, a method for verifying a plurality of cryptographically signed user electronic records is disclosed. The method comprises receiving, at a first communication module of a verification device, a data transmission from a user device (the data transmission comprising a cryptographically signed electronic record for verification) and a corresponding cryptographic proof; and caching, at a local data store of the verification device, at least one cryptographic key (for verifying the plurality of user electronic records) and at least one schema indicating the semantics of one or more electronic record data structures corresponding to the plurality of user electronic records.

When the verification device is in a first mode corresponding to a remote data store being accessible by a second communication module of the verification device that is configured to access the remote data store over the internet, the method further comprises: polling the remote data store, by a processor and the second communication module, to obtain up-to-date copies of the at least one cryptographic key and the at least one schema and to cache these in the local data store. When the verification device is in a second mode corresponding to the remote data store not being accessible by the second communication module, the method further comprises: identifying, upon receipt of the data transmission from the user device, the cached cryptographic key and schema corresponding to the received cryptographically signed electronic record and cryptographic proof. The method further comprises determining a verification result for the cryptographically signed electronic record based on the cryptographic proof and the identified cached cryptographic key and schema; and outputting, from an output of the verification device, an indication of the verification result.

Advantageously, the method enables the authenticity of an electronic record stored on a user device to be independently inspected and reliably verified in an offline environment whilst maintaining a high level of privacy control for the subject of the electronic records. This is particularly valuable for inspectors working on remote outstations or areas where network connectivity is limited and may not be available at the time of inspection of the user electronic record.

Optionally, determining a verification result for the cryptographically signed electronic record comprises operating on the cryptographic proof with the identified cached cryptographic key. This advantageously provides a simple and robust way to verify the electronic record being inspected.

Optionally, the data transmission from the user device is received by the first communication module using one of visual encoding, audio encoding, or radio frequency encoding. In a particular embodiment, the data transmission from the user device is received by a visually encoded data transmission that is read by an imaging device of the verification device. This advantageously provides a direct communication path without requiring any functionality other than a camera and a display, which would typically be present in even basic mobile devices.

Optionally, the remote data store is a blockchain; this provides a single version of truth regarding the required key cryptography that can be shared between many different parties in a simple and cost effective manner. Optionally, the signing of the cryptographically signed electronic record may be by a digital signature, a cryptographic hash, or by a zero-knowledge proof.

Optionally, the method further comprises outputting the indication of the verification result as a visual indication on a display of the verification device. This advantageously provides a quick and effective way for the inspector to review the result of the verification.

Optionally, the cached at least one cryptographic key may be associated with an expiry time and the method may further comprise determining, by the processor, whether the expiry time has elapsed; and outputting, from the output, an indication that the verification is out of date if the expiry time is determined by the processor to have elapsed.

Optionally, the user electronic record is an electronic pilot licence, and the user device is a pilot device.

Optionally, the method further comprises steps taken by the user device. In particular, the method may optionally comprise storing, at a user electronic record store of the user device, the cryptographically signed electronic record and the corresponding cryptographic proof; and sending, from a user device communication module, the data transmission from the user device first communication module of the verification device in response to a user input. This data transmission comprises the cryptographically signed electronic record and the corresponding cryptographic proof.

BRIEF DESCRIPTION OF THE DRAWINGS

Embodiments of the invention will now be described, by way of example only, and with reference to the accompanying drawings, in which.

DETAILED DESCRIPTION

An inspector may desire to review an individual's electronic record document, for example to authenticate that an individual is properly qualified for a given activity, or access to a given area. Where the inspector needs to confirm that the record document stored on a user/record holder's device has not been tampered with or falsified, an inspector may use their own device to interrogate an online database administered by the authority that issued the record document. In some situations, the inspector may be dealing with record documents issued by a wide variety of issuing authorities, for example by corresponding national authorities in many different countries, and accordingly may require some information from the record holder in order to locate and interrogate the online database of the correct issuing authority for the correct user or individual.

This process may still be open to tampering by the user, for example by directing the inspector to the incorrect record at the issuing authority database, or directing the inspector to a fraudulent database comprising falsified record documents. Furthermore, the inspector may not be completely familiar with the official format of (or even the language used in) such record documents. Moreover, this process would require the inspector device to have an active internet connection at the time of performing any verification of the users record documents—without such an internet connection, the inspector would be forced to rely on an unverified electronic record document presented by the user, which may have been tampered with or falsified.

In order to overcome such drawbacks, the inventors have devised an apparatus and system for verifying a plurality of user electronic records, wherein each user electronic record is a cryptographically signed electronic record, that can perform reliable verification even when the verification apparatus does not have access to the internet.

Figure 1:
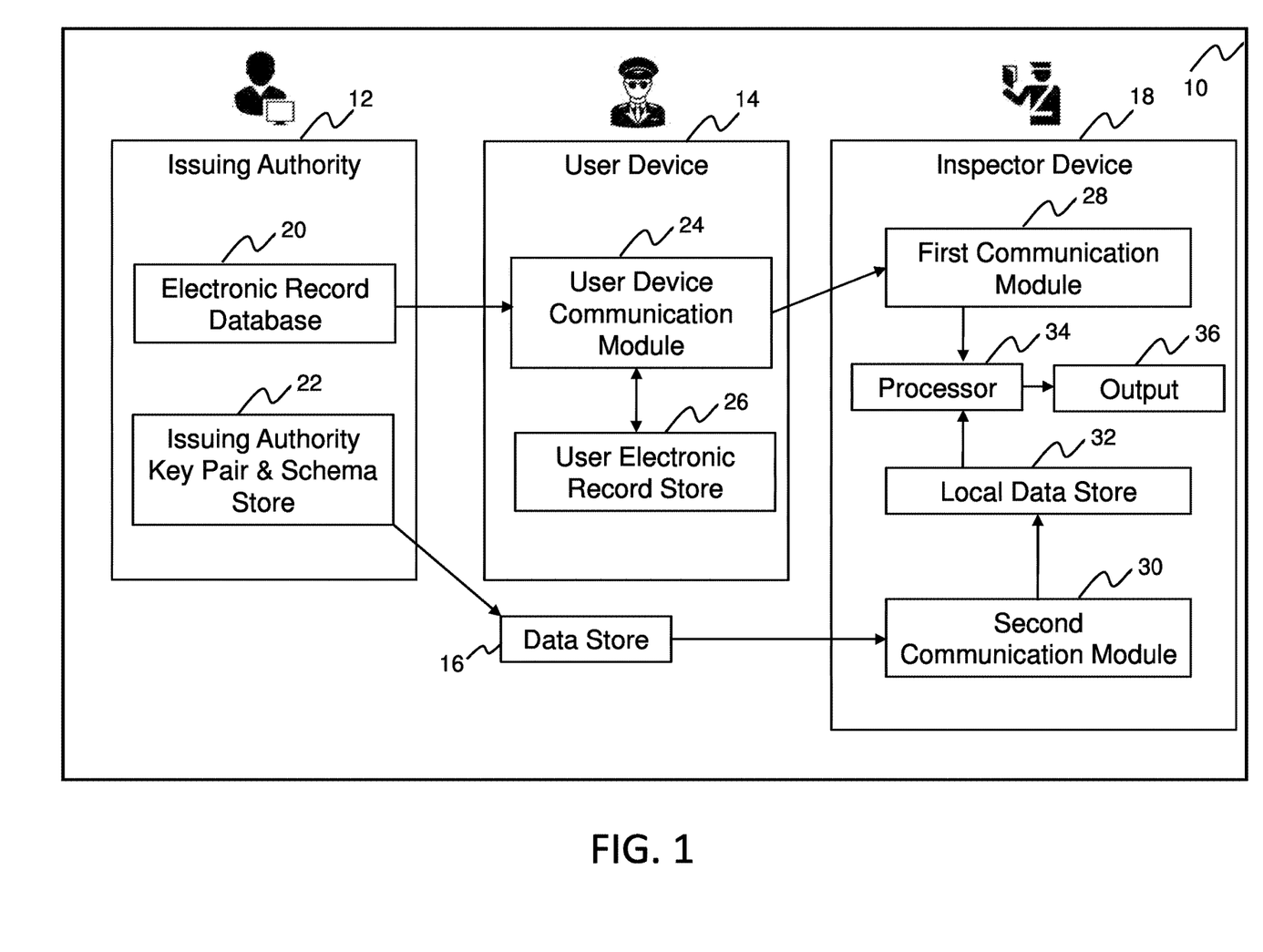
FIG. 1 is a schematic representation of a system according to an embodiment of the invention.

FIG. 1 is a schematic representation of a system 10 according to an embodiment of the invention comprising an issuing authority 12, a user device 14, a data store 16, and an inspector device 18. The issuing authority 12 comprises an electronic record database 20 that stores copies of electronic records issued to users by the issuing authority 12. Record documents may include licences or certificates and corresponding logs, such as pilot licences, boatmasters' licence, driving licences and the like, or record documents identifying or authorising individuals and/or their skills or competencies. For example, the record document may identify an engineer certified to carry out maintenance and repairs to particular systems, or it may identify an individual's access levels to restricted areas.

These logs could include information such as the user's relevant medical records, the number of hours that the user has performed the licenced activity (e.g. hours flown, sailed or driven) for within a given time frame, the types of vehicle the licence covers (e.g. aircraft type, watercraft type, road vehicle type or train type), specific skills accredited to the user and/or languages spoken by the user.

In the following description of the invention, the use case of electronic pilot licences will be discussed, but it will be appreciated that all of the following teaching applies equally to other electronic records, including pilot logs, boatmasters' licence, driving licences, other electronic personnel licences and the like. Similarly, other airport use cases may include electronic record documents that certify an individual's skills or competencies, such as the particular aircraft or other systems that an engineer is certified to carry out maintenance and repairs on. Alternatively, the electronic record document may identify access permissions allowing the individual to access certain restricted areas, for example enabling baggage handlers or security staff to enter the baggage handling areas etc. of an airport.

In the present invention, the electronic pilot licences are cryptographically signed by the issuing authority using private-public key pair cryptography. The electronic pilot licence is signed by the issuing authority using a given private key (or signing key) and the signed version is stored in the electronic record database 20. In one example, this may be in the form of a signed barcode. The electronic pilot licence may include a field indicating the identity of the issuing authority or a specific entity signing for the issuing authority, and accordingly this may link the cryptographically signed electronic pilot licence with the relevant public key to be used for later verification. Where an issuing authority uses multiple private-public key pairs, the field preferably uniquely identifies the particular key pair used for that electronic pilot licence The corresponding private-public key pair for the particular electronic pilot licence may be privately stored in the issuing authority key pair and schema store 22 along with a schema corresponding to the electronic pilot licence.

The schema is a machine-readable definition of the semantics of the electronic pilot licence's data structure and defines the attributes used in one or more identity claims, such as those forming the electronic pilot licence. The schema, public key, electronic pilot licence and corresponding user/pilot may be connected by one or more decentralised identifiers (DIDs). A DID is an identifier that enables verifiable, decentralized digital identity matching that is decoupled from centralized registries, identity providers, and certificate authorities. In this manner, the DID is specific between the two parties and cannot be used to link the user to other identifying information held by other authorities. In some implementations, the DID may be associated with a decentralised identity document (DID document), which includes cryptographic material such as the corresponding public key.

The signed electronic pilot licence is then transmitted from the issuing authority to the user device 14 associated with the user or individual to whom the electronic pilot licence relates. The user device 14 may comprise a user device communication module 24 for communicating with other devices or systems, such as the issuing authority 12 systems or an inspector device 18. This user device communication module 24 may comprise a plurality of communication means for transmitting and receiving data over a wide variety of data channels, such as radio frequency communications (including Wi-Fi® and Bluetooth®) and optical communications (including free space optical communications).

The user device 14 obtains the signed electronic pilot licence from the issuing authority system 12 via the user device communication module 24 and then stores this signed electronic pilot licence in a user electronic record store 26 for subsequent retrieval. The mechanism for transmission may vary from one issuing authority to another. In one example, the user device 14 may connect to the issuing authority system 12 via a cryptographically secure connection formed using a Hyperledger *Aries* invite, which is a base 64 encoding of JSON invite. An example of this is shown below:

```
"invitation": {
    "@type": "did:sov:BzCbsNYhMrjHiqZDTUASHg;spec/connections/1.0/invitation",
    "@id": "706119c7-e26f-4714-a088-32c666c5f9fc",
    "recipientKeys": [
        "3D2HtYDCeREkdCnaZywgZWsFUMzsnnYF4UTaCNYzbcg6"
    ],
    "serviceEndpoint": "https://pilot-api-dev.blockchainsandbox.aero/agent",
    "label": "issuer-agent"
}
```

Once the user device 14 has received the invitation, it may initiate a connection handshake with the issuing authority in accordance with the Hyperledger *Aries* connection protocol. This connection may be initiated via a mediator to ensure that messages get routed correctly to the user device 14 even when the user device has intermittent connectivity and/or a varying IP address throughout the session.

The transmission of the electronic pilot licence from the issuing authority system 12 to the user device 14 may be in response to a request sent from the user device 14 to the issuing authority system 12 (for example by navigating to/logging in to an online portal for download), or alternatively the issuing authority system 12 may distribute the electronic pilot licence via a push mechanism to the user device 14 using one or more known techniques. The electronic pilot licence stored in the user electronic record store 26 preferably includes both the plain text representation of the electronic pilot licence and also the corresponding cryptographic proof, with these elements being cryptographically tied together such that the whole electronic pilot licence credential will be deemed to be invalid even if only one of the elements is altered. Preferably, the electronic pilot licence also includes the DID identifying the issuing authority and the relevant public key from the private-public key pair.

In order to further protect the private or otherwise personally identifying information contained in the electronic pilot licence, the cryptographic proof may be in the form of a zero knowledge proof.

The issuing authority may also publish the public keys and schema for each particular electronic pilot licence to the data store 16. It will be appreciated that a given private-public key pair and/or schema may be used for more than one electronic pilot licence by the issuing authority. For example, the private-public key pair may be specific to a given employee of the issuing authority and as such may be used in all electronic records issued by the given employee, or alternatively all electronic records issued by the given employee within a given time period. The schema might be fixed for one issuing authority, but it will be appreciated that differing schemas may be used by different issuing authorities and the inclusion of the schema information enables interpretation of the electronic pilot licence attributes as well as verifying that the electronic pilot licence has been issued in accordance with an approved schema. In one embodiment, this data store 16 may be implemented as a blockchain that is accessible by the one or more inspector devices 18.

The inspector device 18 may be any mobile computing device that comprises a first communication module 28, a second communication module 30, a local data store 32, a processor 34, and an output 36. It will be appreciated that the first communication module 28 and the second communication module 30 may be integrated into a single inspector device communication module that is able to communicate via one or more communication modes. In an embodiment of the invention, the inspector device 18 is controlled by someone authorised to review and verify the authenticity of an electronic pilot licence stored on a user device 14.

The second communication module 30 of the inspector device 18 may be configured to communicate with the data store 16. If the inspector device 18 determines that the data store 16 is accessible, via the second communication module 30, then the inspector device 18 may read the current public key and schema data stored on the data store 16. This data may then be cached by the inspector device 18 in the local data store 32 of the inspector device 18. This caching may be performed in response to a manual instruction from the inspector, or automatically (for example periodically) when the data store 16 is accessible by the inspector device 18 in order to maintain an up-to-date cached data set of public keys and trusted schemas at the local data store 32. This state of access to the data store 16 may be considered to be a first mode of operation for the inspector device 18.

A second mode of operation for the inspector device 18 may be when the data store 16 is not accessible by the inspector device 18, via the second communication module 30 nor by any other means. According to the invention, it is still possible for the inspector device 18 to perform a verification of an electronic pilot licence stored on a user device 14 while the inspector device is in this second mode of operation. In this mode of operation, it can be assumed that the inspector device does not have internet access/connectivity, rather than the data store 16 simply being offline or the service otherwise being down.

The first obstacle to be overcome is that the inspector device 18 must be able to communicate with the user device 14 so that the inspector device can obtain information about the electronic pilot licence to be verified. This is achieved by using the first communication module 28 of the inspector device 18 and the user device communication module 24 of the user device 14 to enable direct communication between the respective devices.

This communication channel may be achieved over any suitable technology, for example Bluetooth®, Near-Field-Communication, Wi-Fi Direct®, Air Drop® or by encoding data in a visual machine readable format such as a barcode. This communication channel may be used to send the electronic pilot licence along with a corresponding credential proof to be verified by the inspector device 18.

Once received by the inspector device, the details of the electronic pilot licence may be displayed or otherwise communicated to the inspector in some manner. The inspector device 18 may be configured to display the electronic pilot licence in a format that differs from the format as issued by the issuing authority, for example the fields and data may be rearranged and/or translated into a language set by the inspector device. This advantageously enables the inspector device to present the electronic pilot licence details in a consistent format, even when the original formats of the electronic pilot licences issued by differing issuing authorities may vary. This advantageously enables the inspector using the inspector device to more quickly review details presented in electronic pilot licences from a variety of jurisdictions.

In this manner, the electronic pilot licence, or other issued credential, may be recognised and trusted by a wide range of parties across multiple airports and/or across multiple states and governments. This solves a significant challenge in the industry regarding the acceptance of, and trust in, a credential issued in one country or by a given company/authority by other companies/authorities in the same or other countries.

In one implementation of the present disclosure, one or more two-dimensional barcodes such as QR codes may be used by displaying the barcode on a display of the user device 14, which can then be read by the inspector device using a first communication module 28 comprising a camera or other imaging device/sensor. In this manner, the communication and verification procedure may be initiated by the user of the user device 14 and the establishment of the communication channel is greatly simplified because no handshaking mechanism between the two devices is required.

If the volume of data regarding the electronic pilot licence to be communicated from the user device 14 to the inspector device 18 is too large to fit in a single barcode, then multiple barcodes may be used. The multiple barcodes may be animated on a display of the user device 14 so that the imaging sensor of the first communication module 28 may view each of the barcodes in turn, which can then be decoded and the transmitted data reconstructed by the processor 34 of the inspector device 18.

Once the electronic pilot licence and proof have been reconstructed by the inspector device 18 from the transmitted data, the processor extracts the identifier from the transmitted data to ascertain the schema and public key corresponding to the received electronic pilot licence. This schema and public key may be included in the cached data of the local data store 32. Using the schema definition of the electronic pilot licence, the data may be read and the processor may operate on the cryptographic proof (for example a digital signature of the electronic pilot licence data) with the ascertained cryptographic public key in accordance with standard private-public key cryptography techniques.

In this manner, the inspector device does not need to call the issuing authority system, nor even the data store 16, at the time of performing the verification of the electronic pilot licence credential presented by the user device 14. This not only enables the verification to be performed offline, but also improves the user's privacy since removing the need to access the licence information on demand means that the issuing authority (as well as other third parties) cannot infer further private information about the user, such as the timing, regularity and location of inspections of the user's electronic pilot licence by tracking or otherwise correlating such data access.

Because the data store 16 only stores and shares the public keys and schemas associated with the electronic pilot licence or other electronic record, no personally identifying information is stored in the data store 16. The user's personally identifying information resides in the electronic pilot licence itself, which is stored privately by the issuing authority system 12 and on the user's personal user device 14. The user may then determine whether to provide this information to a third party, such as the inspector device 18. In this manner, the user is in control of their own private data.

When the processor 34 of the inspector device 18 has determined a verification result for the transmitted electronic pilot licence, the result may be output on a display of the inspector device, or by an audible indication of the verification result etc.

The public keys cached on the inspector device may be associated with an expiry time. In this case, the processor 34 may also determine whether a public key cached in the local data store 32 has expired prior to performing the cryptographic verification of the electronic pilot licence proof and a corresponding result may be indicated in the output. In this manner issuing authority private-public key pairs may be refreshed and any compromised private keys may be removed from use.

In one example of the present disclosure, the cryptographically signed electronic pilot licence (or other electronic record) may be signed by the issuing authority using one of a digital signature, a cryptographic hash, or a zero-knowledge proof.

In a further example of the present disclosure, the issuing authority may cause the electronic pilot licence (or other electronic record document) to be cryptographically linked to the specific user device 14, or alternatively to an electronic wallet associated with the user of the user device 14. In this manner, the cryptographic proof may be tied to the electronic wallet and/or the user device 14 such that the electronic pilot licence would be identified as being invalid if it was copied to another digital wallet or user device respectively. This advantageously further improves the security of the electronic pilot licence and the robustness of the inspection/verification procedure. This could be achieved by the user providing the issuing authority with an identification of the electronic wallet or user device 14 that the electronic pilot licence should be sent to in advance of the creation of that electronic pilot licence credential.

It will be appreciated that, while the above system is particularly beneficial for verification of electronic records in the second mode, i.e. where there is no internet access, the corresponding method may also be used when internet access is available.

Alternatively, a different mechanism may be used where the inspector device 18 is in communication with a user device 14 during an online mode. For example, the communication may still be initiated by the user device 14 presenting a QR code to an imaging sensor of the inspector device 18; however, this QR code could encode an *Aries* connection invitation as described earlier. Once the QR code has been scanned by the inspector device, a secure communication channel may be formed over a cellular connection (e.g. 4G) or a Wi-Fi connection between the user device 14 and the inspector device 18.

Upon connection, the inspector device 18 may issue a proof request to the user device 14. This proof request may be based on the relevant electronic pilot licence schema and may specify only a subset of the available fields, for example identifying a certain selection of fields relating to a certain schema issued by a certain issuing authority. If the user electronic record store 26 of the user device 14 comprises an electronic pilot licence that matches the request then the corresponding proof will be sent to the inspector device 18 for verification. The processor 34 of the inspector device 18 may then verify the electronic pilot licence in accordance with the *Aries* verification protocol as well as the schema and corresponding decentralised ID stored in the data store 16.

Figure 2A:
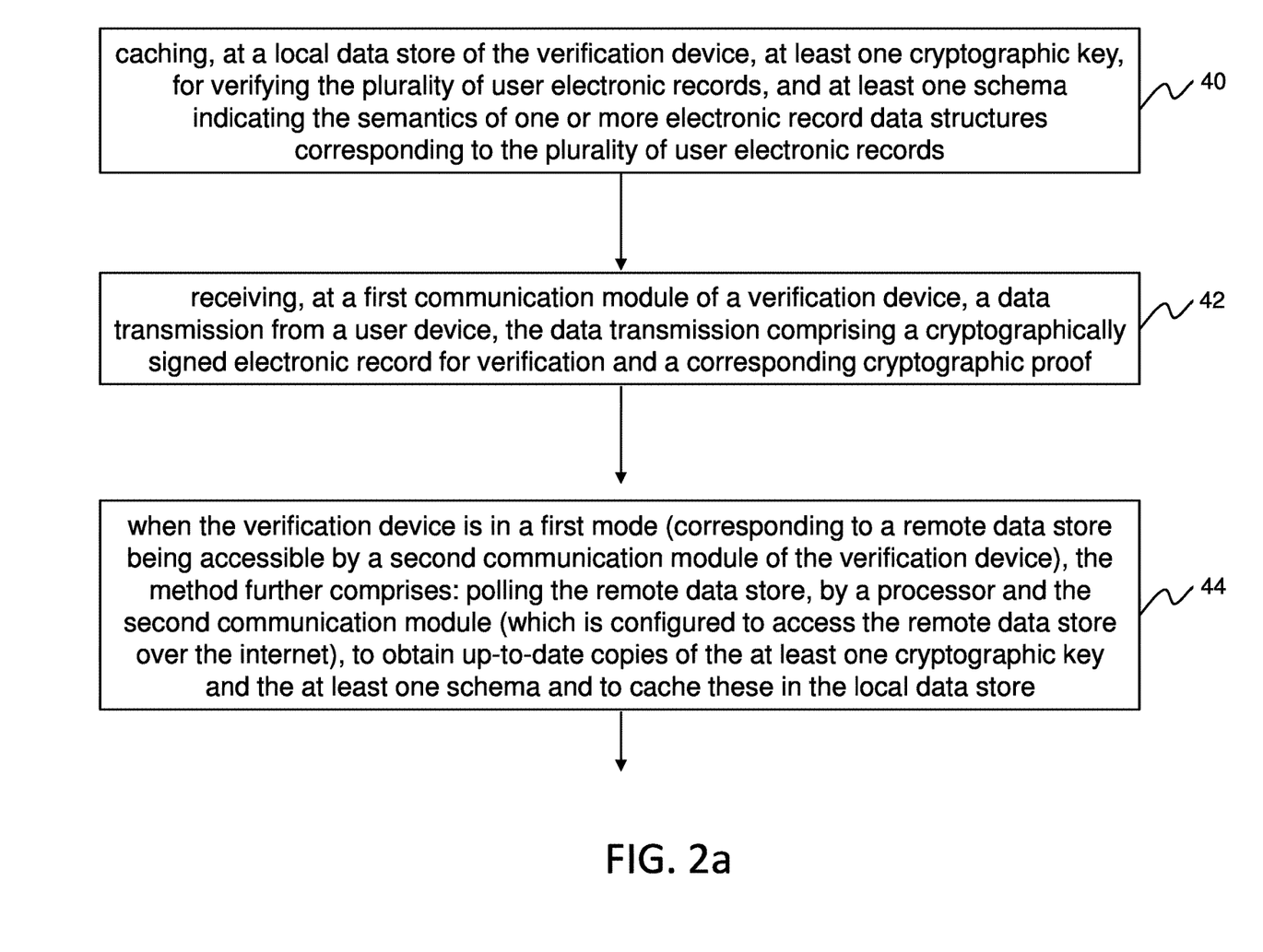
FIGS. 2a and 2b form a flow diagram showing the steps performed by another embodiment of the invention.
Figure 2B:
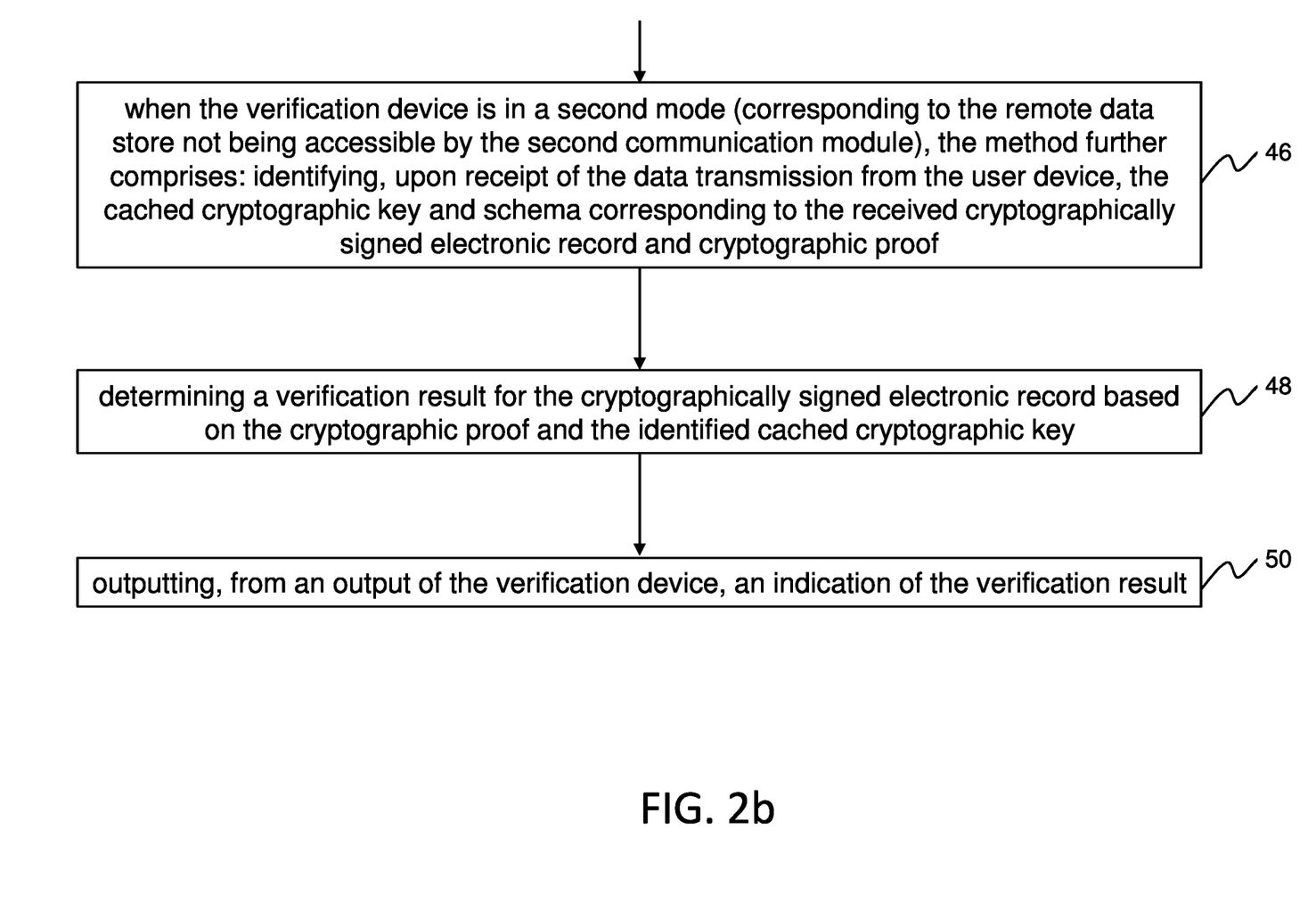

FIGS. 2a and 2b form a flow diagram showing the steps performed by another embodiment of the invention. In step

40, the method comprises caching, at a local data store of the verification device, at least one cryptographic key, for verifying the plurality of user electronic records, and at least one schema indicating the semantics of one or more electronic record data structures corresponding to the plurality of user electronic records.

At step 42, the method comprises receiving, at a first communication module of a verification device, a data transmission from a user device, the data transmission comprising a cryptographically signed electronic record for verification and a corresponding cryptographic proof. In examples of the present disclosure, the data transmission may take place over one of a visually encoded communication path, an audio encoded communication path, or a radio frequency encoded communication path.

Step 44 of the method is relevant when the verification device is in a first mode corresponding to a remote data store being accessible by a second communication module of the verification device. In this first mode, the method further comprises polling the remote data store, by a processor and the second communication module (which is configured to access the remote data store over the internet), to obtain up-to-date copies of the at least one cryptographic key and the at least one schema and to cache these in the local data store.

Step 46 of the method is relevant when the verification device is in a second mode corresponding to the remote data store not being accessible by the second communication module. In this second mode, the method further comprises identifying, upon receipt of the data transmission from the user device, the cached cryptographic key and schema corresponding to the received cryptographically signed electronic record and cryptographic proof.

At step 48 a verification result for the cryptographically signed electronic record is determined based on the cryptographic proof and the identified cached cryptographic key and then at step 50 an indication of the verification result is output from the verification device, for example on a display. In one example, the verification result may be determined by operating on the cryptographic proof with the identified cached cryptographic key. This cryptographic method may include one or more of a digital signature, a cryptographic hash, or by a zero-knowledge proof.

In one example, the cryptographic key may be associated with an expiry time, after which the cryptographic key will be deemed invalid. In such an example, the method may further comprise determining, by the processor, whether the expiry time has elapsed; and further outputting, from the output, an indication that the verification is out of date if the expiry time is determined by the processor to have elapsed.

For completeness, it is noted that the flowcharts of FIGS. 2a and 2b illustrate the operation of an example implementation of a method according to the present disclosure. Each block in the flowcharts may represent a module comprising one or more executable computer instructions, or a portion of an instruction, for implementing the relevant logical function specified in the block. The order of blocks in the Figures is only intended to be illustrative of an example. In alternative implementations, the logical functions illustrated in particular blocks may occur out of the order noted in Figures. For example, the processes associated with two blocks may be carried out simultaneously or, depending on the functionality, in the reverse order. Moreover, each block in the flowchart may be implemented in software, hardware or a combination of software and hardware.

As will be appreciated by the skilled person, the subject matter described herein may be embodied in whole or in part as a method, a system, or a computer program product including computer readable instructions. Accordingly, the subject matter of the present disclosure may take the form of an entirely hardware embodiment, an entirely software embodiment, or an embodiment combining software, firmware, hardware and/or any other suitable approach or apparatus.

Any computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

The invention claimed is:

1. An apparatus for verifying a plurality of user electronic records, wherein each user electronic record is a cryptographically signed electronic record, the apparatus comprising:
   a first communication module configured to receive a data transmission from a user device, the data transmission comprising a cryptographically signed electronic record for verification and a corresponding cryptographic proof;
   a local data store configured to cache at least one cryptographic key, for verifying the plurality of user electronic records, and at least one schema indicating the semantics of one or more electronic record data structures corresponding to the plurality of user electronic records;
   a second communication module configured to communicate with a remote data store over the internet;
   a processor configured, in a first mode, to poll the remote data store, via the second communication module, to obtain up-to-date copies of the at least one cryptographic key and the at least one schema and to cache these in the local data store; and further configured, in a second mode, to:
      upon receipt of the data transmission from the user device, identify the cached cryptographic key and schema corresponding to the received cryptographically signed electronic record and cryptographic proof; and
      determine a verification result for the cryptographically signed electronic record based on the cryptographic proof and the identified cached cryptographic key and schema; and
   an output configured to provide an indication of the verification result from the apparatus;
   wherein the first mode corresponds to the remote data store being accessible by the apparatus, via the second communication module, and the second mode corresponds to the remote data store not being accessible by the apparatus.

2. The apparatus of claim 1, wherein determining a verification result for the cryptographically signed electronic record comprises operating on the cryptographic proof with the identified cached cryptographic key.

3. The apparatus of claim 1, wherein the first communication module is configured to receive the data transmission from the user device over one of a visually encoded, audio encoded, or radio frequency encoded communication channel.

4. The apparatus of claim 3, wherein the first communication module comprises an imaging device configured to read the visually encoded data transmission.

5. The apparatus of claim 1, wherein the remote data store is a blockchain, and wherein the signing of the cryptographically signed electronic record is by a digital signature, or by a cryptographic hash, or by a zero-knowledge proof.

6. The apparatus of claim 1, wherein the output comprises a display, and wherein the output is configured to provide the indication of the verification result as a visual indication output to the display.

7. The apparatus of claim 1, wherein the cached at least one cryptographic key is associated with an expiry time; wherein the processor is further configured to determine whether the expiry time has elapsed; and wherein the output is further configured to provide an indication that the verification is out of date if the expiry time is determined by the processor to have elapsed.

8. The apparatus of claim 1, wherein the user electronic record is an electronic pilot licence, and the user device is a pilot device.

9. A system comprising:
a user device; and
an apparatus comprising:
a first communication module configured to receive a data transmission from the user device, the data transmission comprising a cryptographically signed electronic record for verification and a corresponding cryptographic proof;
a local data store configured to cache at least one cryptographic key, for verifying the plurality of user electronic records, and at least one schema indicating the semantics of one or more electronic record data structures corresponding to the plurality of user electronic records;
a second communication module configured to communicate with a remote data store over the internet;
a processor configured, in a first mode, to poll the remote data store, via the second communication module, to obtain up-to-date copies of the at least one cryptographic key and the at least one schema and to cache these in the local data store; and further configured, in a second mode, to:
upon receipt of the data transmission from the user device, identify the cached cryptographic key and schema corresponding to the received cryptographically signed electronic record and cryptographic proof; and
determine a verification result for the cryptographically signed electronic record based on the cryptographic proof and the identified cached cryptographic key and schema; and
an output configured to provide an indication of the verification result from the apparatus, wherein the first mode corresponds to the remote data store being accessible by the apparatus, via the second communication module, and the second mode corresponds to the remote data store not being accessible by the apparatus.

10. The system of claim 9, wherein the user device comprises:
a user electronic record store configured to store the cryptographically signed electronic record and the corresponding cryptographic proof; and
a user device communication module configured to, in response to a user input, send the data transmission from the user device to the apparatus, wherein the data transmission comprises the cryptographically signed electronic record and the corresponding cryptographic proof.

11. A method for verifying a plurality of user electronic records, wherein each user electronic record is a cryptographically signed electronic record, the method comprising:
receiving, at a first communication module of a verification device, a data transmission from a user device, the data transmission comprising a cryptographically signed electronic record for verification and a corresponding cryptographic proof; and
caching, at a local data store of the verification device, at least one cryptographic key, for verifying the plurality of user electronic records, and at least one schema indicating the semantics of one or more electronic record data structures corresponding to the plurality of user electronic records;
wherein, when the verification device is in a first mode corresponding to a remote data store being accessible by a second communication module of the verification device, the method further comprises:
polling the remote data store, by a processor and the second communication module, to obtain up-to-date copies of the at least one cryptographic key and the at least one schema and to cache these in the local data store, wherein the second communication module is configured to access the remote data store over the internet; and
wherein, when the verification device is in a second mode corresponding to the remote data store not being accessible by the second communication module, the method further comprises:
identifying, upon receipt of the data transmission from the user device, the cached cryptographic key and schema corresponding to the received cryptographically signed electronic record and cryptographic proof;
determining a verification result for the cryptographically signed electronic record based on the cryptographic proof and the identified cached cryptographic key and schema; and
outputting, from an output of the verification device, an indication of the verification result.

12. The method of claim 11, wherein determining a verification result for the cryptographically signed electronic record comprises operating on the cryptographic proof with the identified cached cryptographic key.

13. The method of claim 11, wherein the data transmission from the user device is received by the first communication module using one of visual encoding, audio encoding, or radio frequency encoding.

14. The method of claim 13, wherein the data transmission from the user device is received by a visually encoded data transmission that is read by an imaging device of the verification device.

15. The method of claim 11, wherein the remote data store is a blockchain, and wherein the cryptographically signed electronic record is signed by one of a digital signature, a cryptographic hash, or by a zero-knowledge proof.

16. The method of claim 11, further comprising outputting the indication of the verification result as a visual indication on a display of the verification device.

17. The method of claim 11, wherein the cached at least one cryptographic key is associated with an expiry time; and wherein the method further comprises:
- determining, by the processor, whether the expiry time has elapsed; and
- outputting, from the output, an indication that the verification is out of date if the expiry time is determined by the processor to have elapsed.

18. The method of claim 11, wherein the user electronic record is an electronic pilot licence, and the user device is a pilot device.

19. The method of claim 11, wherein the method further comprises:
- storing, at a user electronic record store of the user device, the cryptographically signed electronic record and the corresponding cryptographic proof; and
- sending, from a user device communication module, the data transmission from the user device first communication module of the verification device in response to a user input; wherein the data transmission comprises the cryptographically signed electronic record and the corresponding cryptographic proof.

* * * * *